United States Patent [19]
Williams

[11] Patent Number: 5,983,821
[45] Date of Patent: Nov. 16, 1999

[54] MULTILINE TOW CABLE ASSEMBLY INCLUDING SWIVEL AND SLIP RING

[75] Inventor: Michael R. Williams, West Kingston, R.I.

[73] Assignee: The United States of America as represented by the Secretary of the Navy, Washington, D.C.

[21] Appl. No.: 09/137,870

[22] Filed: Aug. 12, 1998

[51] Int. Cl.$^6$ ........................... B63B 21/66
[52] U.S. Cl. ........................... 114/244
[58] Field of Search ........................... 114/242, 244, 114/249, 253, 230.1, 230.2, 230.26, 230.28

[56] References Cited

U.S. PATENT DOCUMENTS

| | | | |
|---|---|---|---|
| 3,793,623 | 2/1974 | Gongwer | 114/244 |
| 4,281,402 | 7/1981 | Kruka et al. | 114/253 |
| 4,756,268 | 7/1988 | Gjestrum et al. | 114/242 |
| 5,204,843 | 4/1993 | Beauducel | 114/244 |
| 5,673,644 | 10/1997 | Vanasse et al. | 114/244 |

*Primary Examiner*—Stephen Avila
*Attorney, Agent, or Firm*—Michael J. McGowan; Prithvi C. Lall; Michael F. Oglo

[57] ABSTRACT

A multiline tow cable assembly including swivel area components and slip ring components. The swivel area components include a rotor member connected to an external housing, at least one contact member formed within the rotor member and rotatable with the rotor, and first electrical leads connected to the at least one contact member. The slip ring components include a multiline termination member, a stator connected to the multiline termination member, at least one contact pin formed in connection with the stator, and second electrical leads connected to the at least one contact pin. A substantially friction free member is interposed between the swivel area components and the slip ring components for enabling relative rotation of the swivel area components with respect to the slip ring components. By the described assemblies, continuous electrical connection is maintained between the first and second electrical leads upon rotation of the swivel area components with respect to the slip ring components.

14 Claims, 4 Drawing Sheets

MULTILINE TOW CABLE ASSEMBLY INCLUDING SWIVEL AND SLIP RING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a multiline tow cable assembly including a swivel and slip ring. More particularly, the invention relates to a multiline array assembly including a swivel and slip ring combination for use between a tow cable and a towed array.

(2) Description of the Prior Art

The following patents, for example, disclose towing and mooring of vessels using rings, and in some instances swivel type rings, but do not disclose a swivel and slip ring assembly for reducing the torque on a towed object.

Specifically, U.S. Pat. No. 3,167,103 to Hawthorne et al. relates to flexible vessels such as barges and storage containers, particularly collapsible vessels intended primarily for the transport and/or storage of fluids and pourable solids. The device more particularly focuses on improving the method of manufacture of the vessel. According to the disclosure, a flexible envelope for a vessel is attached to a retaining ring which is adapted to be secured to a rigid end piece of the vessel, the end piece being provided with an annular shoulder against which the ring bears when the envelope is taut. The envelope may be attached to the ring by having its strength-giving layer turned over the ring and then sewn to itself. The shoulder may be formed by a recessed emplacement for the ring provided in the end piece or by one of two annular plates for which a seating is provided on the end-piece and between which the ring can be clamped.

U.S. Pat. No. 3,670,686 to Reynolds discloses a submerged mooring system for a tanker which is being loaded or unloaded. The mooring system permits the tanker to drift with the wind and/or current while maintaining the bow of the tanker headed toward the anchor point. The mooring system incorporates a swivel which rotates around a vertical axis as the heading of the tanker changes with variations in the wind and/or current. The swivel comprises a column means, a circular mooring ring loosely encircling and slidable circumferentially around the column means, means for retaining the mooring ring on the column means, and a slip ring linked with and slidable circumferentially of the mooring ring, the mooring line being connected to the slip ring. A hose for loading or unloading the tanker extends between the tanker and the mooring system and the mooring system incorporates another swivel which permits the hose to swivel about the same axis as the mooring swivel in response to changes in the heading of the tanker.

U.S. Pat. No. 3,793,623 to Gongwer discloses a hydrodynamic stabilizing device for use in high speed deployment and recovery of cable-suspended underwater devices making use of a swivelable tail or shroud. The device shown is a generally cylindrical underwater sonar transducer having a comparatively flat or blunt frontal surface entering the water and a tapered configuration near the upper or cable-suspended end and having a spaced frustoconical shroud or tail structure. The means of attachment of the cable to the body of the transducer includes a connector supporting the shroud and having a swivelable joint. A spring in the body is calibrated to hold the connector tightly against the body during descent, thereby holding the shroud firmly in place; but this spring yields under the greater force required to draw the transducer up out of the water, permitting an axial displacement of the connector and releasing the tail or shroud to permit the body to swivel relative to the shroud. Since the shroud always maintains its alignment relative to the end of the cable, perturbations affecting the body will always be damped out, causing the body to trail the shroud and cable, and ascent is as smooth and fast as the descent.

U.S. Pat. No. 4,281,402 to Kruka et al. disclose a marine cable decoupler apparatus for isolating a towed marine streamer from noise transmitted from the tow vessel. The decoupling device comprises a fluid spring positioned in the tow cable with changes in the spring constant being minimized by controlling the fluid pressure.

U.S. Pat. No. 4,756,268 to Gjestrum et al. disclose an angular member provided on seismic cables towed by a vessel and laterally displaced in parallel and in relation to the course of the vessel. The angular member comprises a frame at least partly enclosing the cable in the area of angular deflection between an inner cable portion and extending obliquely to the towing direction and the active main cable portion. The frame is formed of two frame plates secured in a spaced relationship and having at the lead-in end for the cable a cable-fastening device and at the other end a pivotable ramp swingable in the plane of the frame plates. The ramp has a further fastening device for the cable. Another fastening device is pivotably connected to the frame plates for connecting thereto a wire to a paravane or the like. When towed in the water the angular member absorbs most of the forces normally exerted on the cable at the area of angular deflection.

It should be understood that the present invention would in fact enhance the functionality of the above patents by providing a continuous electrical connection between a tow cable and towed array without damaging electrical components due to torque on the assembly. The enhanced functionality of the present invention is achieved at least in part by providing a combined swivel and slip ring assembly at an aft end of the tow cable.

SUMMARY OF THE INVENTION

Therefore it is an object of this invention to provide a multiline tow cable assembly.

Another object of this invention is to provide a multiline tow cable assembly including a tow cable and a towed array which reduces an amount of torque applied to the towed array.

Still another object of this invention is to provide a multiline tow cable assembly which reduces an amount of torque applied to the towed array.

Yet another object of this invention is to provide a multiline tow cable assembly which reduces an amount of torque applied to the towed array by providing at least a swivel component in the assembly.

A still further object of this invention is to provide a multiline tow cable assembly which reduces an amount of torque applied to the towed array by providing at least a slip ring component in combination with the swivel component.

Still another object of the invention is to provide a multiline tow cable assembly which reduces an amount of torque applied to the towed array in an efficient manner which is simple to manufacture and easy to use.

In accordance with one aspect of this invention, there is provided a multiline tow cable assembly including swivel area component and slip ring components. The swivel area components include a rotor member connected to an external housing, at least one contact member formed within the rotor member and rotatable with the rotor, and first electrical leads connected to the at least one contact member. The slip ring components include a multiline termination member, a stator connected to the multiline termination member, at least one contact pin formed in connection with the stator, and second electrical leads connected to the at least one contact pin. A substantially friction free member is interposed between the swivel area components and the slip ring components for enabling relative rotation of the swivel area components with respect to the slip ring components. Continuous electrical connection is maintained between the first and second electrical leads upon rotation of the swivel area components with respect to the slip ring components.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a multiline array assembly, and more particularly to a multiline array having a swivel and slip ring assembly provided therein.

Figure 1:
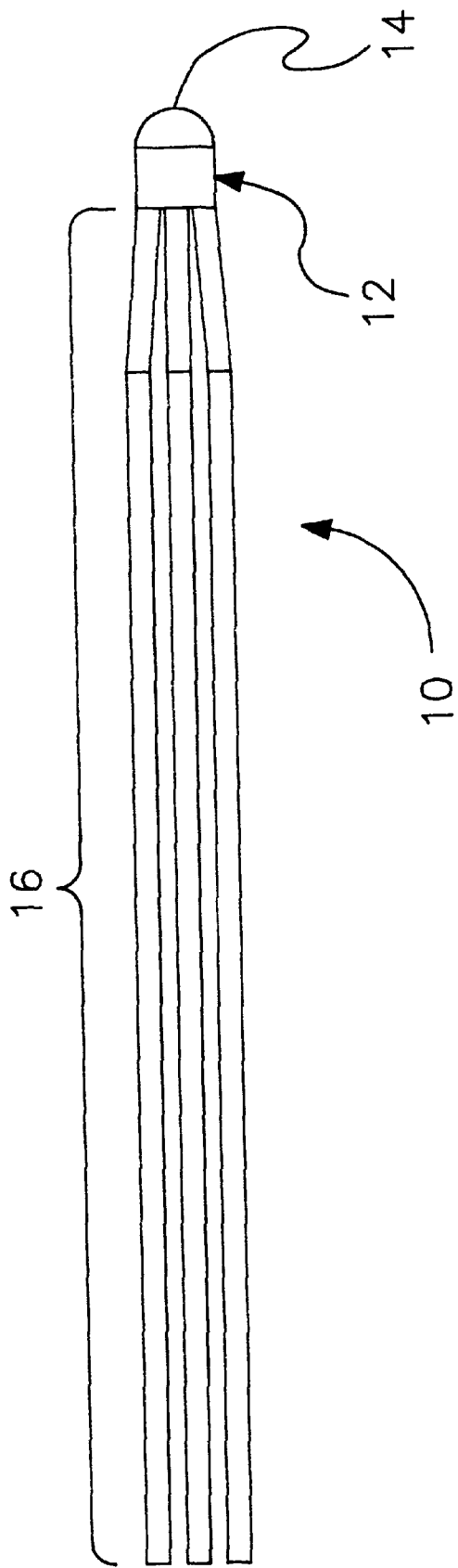
FIG. 1 is a side view of a multiline array assembly according to a preferred embodiment of the present invention.

Referring first to FIG. 1, there is generally disclosed a multiline array assembly 10 having an inventive swivel and slip ring combination 12, a tow cable 14, and a towed array 16. The swivel and slip ring combination 12 of the array assembly 10 provides the mechanical and electrical interface between the tow cable 14 and a towed array 16. As will be further understood from the following detailed description, the swivel and slip ring assembly 12 provides a means of supporting all loads applied by the towed array 16, allows rotation of the tow cable end independent of the towed array 16, and provides a continuous electrical path between the tow cable 14 and towed array 16, even during rotations of the tow cable end.

Referring still to FIG. 1, the towed array portion 16 of the multiline tow cable assembly 10 includes a plurality of acoustic sensors of the type which may collect and transmit acoustic data via a plurality of electrical connections. The electrical connections are intended to run from the sensors though the array 16 and tow cable 14 to a vessel towing the array. The makeup of the towed array portion 16 is not critical to the disclosed invention and will not be discussed in further detail except to the extent that it affects or determines a connection by the swivel and slip ring assembly 12 with the towed array 16.

Figure 2:
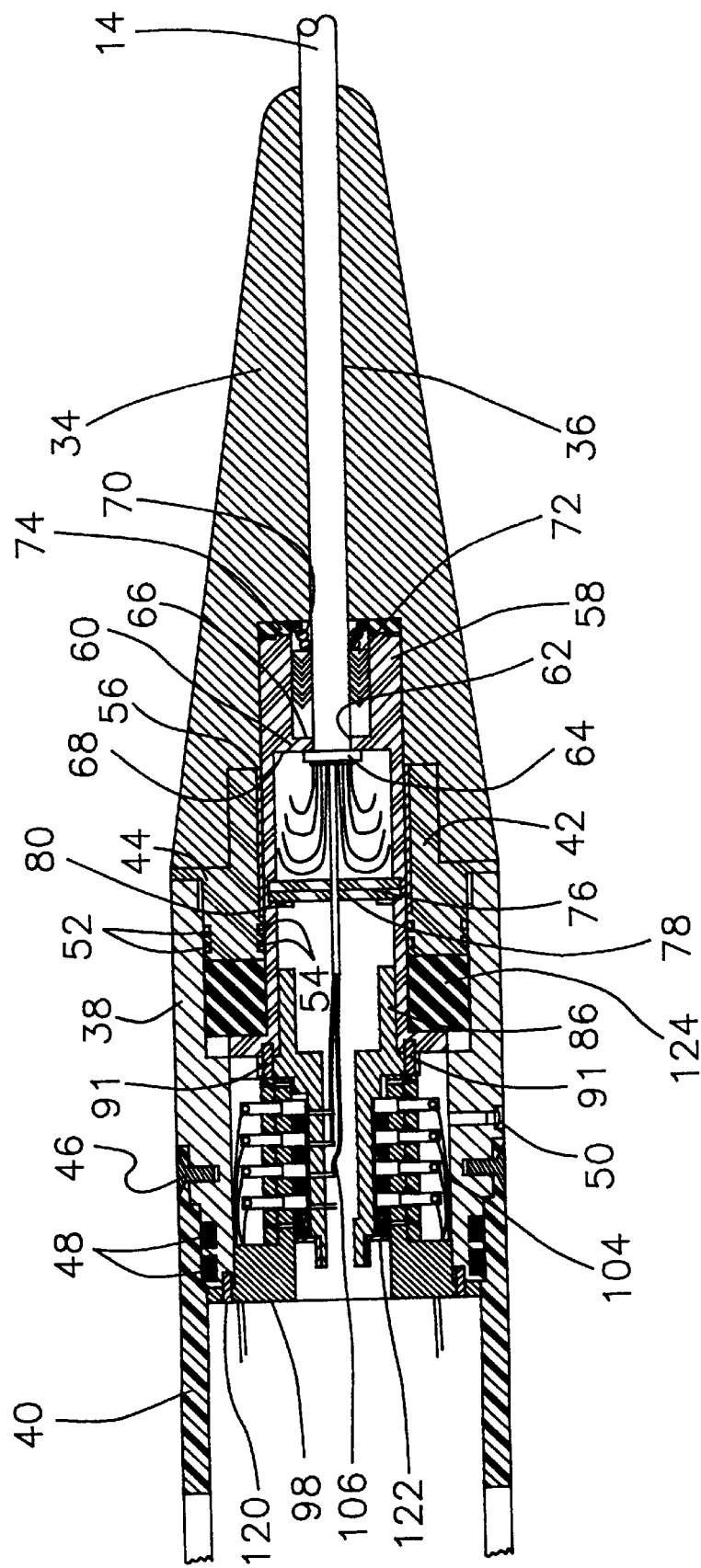
FIG. 2 is a side sectional view of a portion of the multiline array assembly shown in FIG. 1.

Turning now to FIG. 2, a problem in the art is that the design requirements of the multiline array assembly 10 require that no torque be applied to a front of the towed array 16 by the tow cable 14. A standard or improved tow cable 14 will rotate and apply torque with varying tension. It is known that the aft end of the tow cable 14 will rotate seven degrees per foot when the tension applied to the tow cable 14 is changed from 0 pounds to 2000 pounds. This means that if a standard amount of cable is deployed (2000 feet) and a submarine pulling the multiline tow cable assembly 10 increases speed, the aft end of the tow cable 14 will rotate through forty complete revolutions and apply the equivalent torque (rotational energy) to the front of the towed array 16. Furthermore, if a way is found to allow the tow cable 14 to rotate independently of the towed array 16, then a means must be found to allow electrical power and data signals to pass unaffected through that interface. The high power requirements and a requirement to eliminate "single point of failure" modes requires an inventive swivel and slip ring assembly as disclosed herein to be incorporated into the multiline tow cable assembly. The swivel and slip ring assembly must also be compatible with any existing handling system and match the envelope of the present tow cable termination. Additionally, the device must be capable of operating under the standard environmental conditions seen by towed arrays including pressure, temperature ranges, compatibility with sea water, and the like. The device must also provide a service life of a minimum of six years in these environments without maintenance or degradation of performance.

The swivel and slip ring assembly of the invention meets the requirements identified above and includes two major subassemblies of swivel area components and slip ring components as part of the multiline array assembly 10. The subassemblies are both located at the aft end of the tow cable 14.

Referring first to the components of the swivel area subassembly, there is a nose cone 34 having a longitudinal aperture 36 formed therethrough. The longitudinal aperture 36 receives the tow cable 14 therein as will be further described. The nose cone 34 aligns with an outer sleeve 38 and an assembly hose 40. An inner sleeve 42 is set inside of both the nose cone 34 and the outer sleeve 38 and includes a peripherally projecting flange portion 44 separating the nose cone 34 from the outer sleeve 38. The assembly hose 40 is attached to the outer sleeve 38 with a suitable securing member such as at least one threaded screw 46. Essentially, the assembly hose 40 overlaps with the outer sleeve 38 to an extent sufficient to attach the assembly hose to the outer sleeve. In order for the overlap of the assembly hose 40 to occur, the assembly hose is formed of a sturdy flexible material. The flexibility also permits a secure connection without leaks or the like.

At least one O-ring 48 separates the assembly hose 40 from the outer sleeve 38 at a trailing end of the outer sleeve 38 as shown in FIG. 2. The outer sleeve 38 includes a check valve 50 formed therein for enabling fluid expulsion from the internal components. The inner sleeve 42 is spaced from the outer sleeve 38 by at least one outer O-ring 52 and spaced from the slip ring components by at least one inner O-ring 54 and a slider ring 56. The slider ring 56 extends nearly the entire axial length of the inner sleeve 42 and terminates adjacent the at least one inner O-ring 54.

Figure 3:
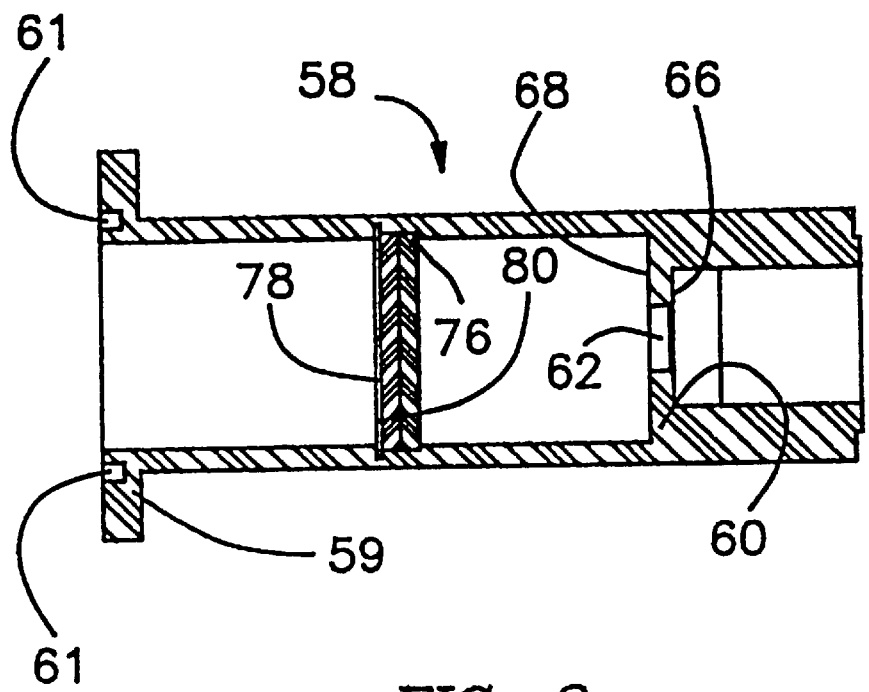
FIG. 3 is a side sectional view of a multiline termination member with the multiline array assembly of FIG. 2.

Referring now to FIGS. 2 and 3, there is shown a multiline termination member 58 of a substantially cylindrical shape. The multiline termination member 58 is divided into two separate parts by an internal wall 60. The internal wall 60 includes an aperture 62 formed therein through which the tow cable 14 passes and defines a fore side 66 toward the tow cable 14 end and an aft side 68 toward a slip ring assembly 32 end. The slip ring assembly per se is shown in detail in FIG. 4. The multiline termination member 58 additionally includes an outer peripheral flange 59 at the aft end 68 thereof. The outer peripheral flange 59 includes at least one opening 61 formed therein having a function to be described later.

Referring briefly again to the tow cable 14, a flanged member 64 is formed at the aft end of the tow cable 14 and seats against the internal wall 60 on the aft side 68 thereof. With termination of the tow cable 14 at the flanged member 64, the electrical components extending through the tow cable 14 of the multiline tow cable assembly 10 are exposed at that point.

Continuing, the multiline termination member 58 further includes a V-ring adapter 70 and a V-ring packing 72 on the fore side 66 of the internal wall 60. The fore end 66 of the multiline termination member 58 is connected to the nose cone 34 by a nose cone attachment plate 74. The purpose of the V-ring adapter 70 and the V-ring packing 72 in combination with the multiline termination member 58 is to prevent rotation of the tow cable 14 within the nose cone 34 and to provide a seal against pressure and the intrusion of fluid.

On the aft side 68 of the internal wall 60 of the multiline termination member 58 there is a rubber grommet 76, a seal plate 78, and a snap ring 80 joined together as shown. Each of the rubber grommet 76 and the seal plate 78 have an aperture (not shown), formed therethrough at an axially central portion thereof. Electrical connections of the tow cable 14 are threaded through the apertures of the rubber grommet 76 and seal plate 78 and the snap ring 80 holds the rubber grommet 76 and the seal plate 78 in place.

Figure 4:
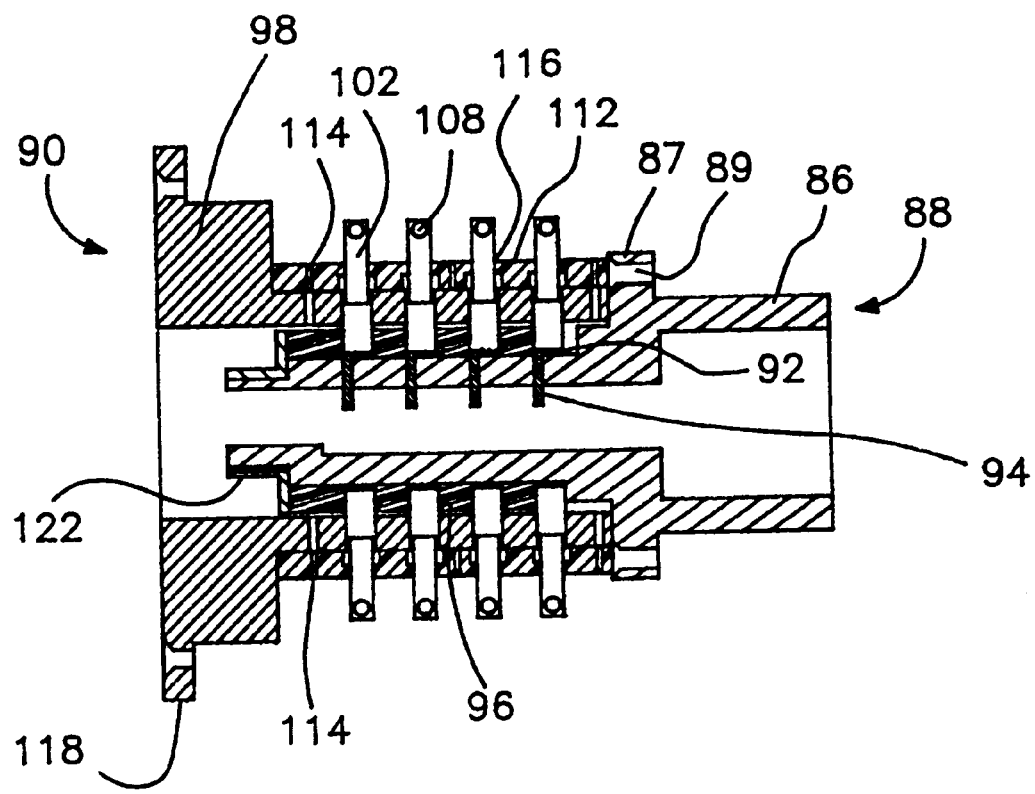
FIG. 4 is a side sectional view of a slip ring assembly in the multiline array assembly of FIG. 2.

The slip ring assembly is best shown in the detail of FIG. 4 and includes a stator 86 having a fore end 88 rotatably fit within the aft end 68 of the multiline termination member 58 and an aft end 90 opposite the fore end 88. A stator flange member 87 is formed to extend from the outer peripheral surface of the stator as shown. The flange member 87 includes at least one aperture 89 formed therein. The aperture 89 is positioned in alignment with a corresponding one of the at least one aperture 61 (FIG. 3) of the multiline termination member 58. An alignment pin 91 is inserted into the aligned apertures 89 and 61 for securing the alignment of the multiline termination member 58 with the stator 86 such that the multiline termination member 58 and stator 86 rotate together.

Figures 5A, 5B:
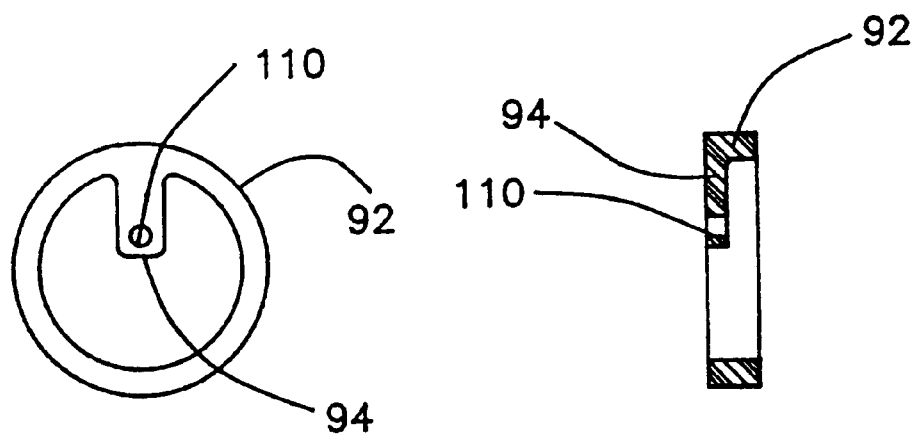
FIG. 5A is an end view and FIG. 5B is a side sectional view of a contact ring for use with the slip ring assembly of FIG. 4.

Additionally, a plurality of contact rings 92 are fit within the stator 86. A single contact ring 92 is shown in detail in FIGS. 5A and 5B, and has a tongue portion 94 extending from the ring to an interior axial space defined by the circumference of the ring 92. At an inner radial end of the tongue portion 94, there is an aperture 110 formed therein. The aperture 110 receives wiring 106 which is initially passed through the rubber grommet 76, seal plate 78, and snap ring 80. The contact ring 92 is of a predetermined width and the tongue portion 94 depends from an edge of the contact ring 92 as shown in FIG. 5B. The tongue portion 94 of the contact ring 92 extends from the outer periphery of the ring 92 to substantially the cental axis thereof. Referring again to FIG. 4, a spacer 96 is positioned between each of the contact rings 92. In the embodiment shown, there are four contact rings 92 and four spacers 96 with one of the spacers 96 set at the aft end 90 of the last contact ring 92.

Figure 6:
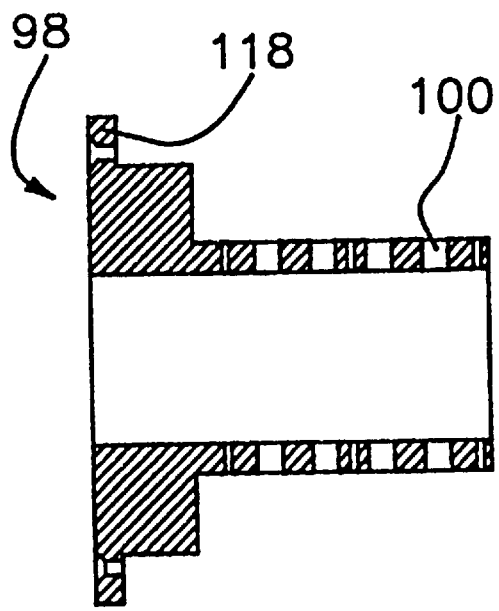
FIG. 6 is a side sectional view of a rotor for use with the slip ring assembly shown in FIG. 4.

A rotor 98 is coaxially aligned with and substantially surrounds the stator 86. The detail of rotor 98 is shown in FIG. 6 and includes a plurality of radially formed apertures 100 therein for receiving a corresponding plurality of contact pins 102. Each contact pin 102 is radially aligned with and connects with an outer periphery of a respective contact ring 92. At an outer end of each contact pin 102, there is a means 108 for connecting the contact pin 102 to wiring 104 of the towed array 16. By way of example, the means for connecting 108 to the wiring 102 may be an aperture formed in the outer end of each contact pin 102, soldering of the wiring to the contact pin 102, or any similar suitable connection. The contact pins 102 rotate with the rotor 98, yet maintain contact with the outer periphery of the contact ring 92, thereby enabling a continuous electrical connection between the electrical leads 104 connected to the aperture 108 of the contact pin 102 and the electrical leads 106 connected to the aperture 110 in the tongue portion 94 of the contact ring 92.

Referring again to the rotor 98, a rotor plate 112 is connected to the rotor 98 by a plurality of screws 114 or the like. The rotor plate 112 has a plurality of apertures 116 formed therein which align with the radially extending contact pins 102 such that a single contact pin 102 protrudes through a single aperture 116. A flange portion 118 extends radially outward from the aft end of the rotor 98, the flange portion receiving screws 120 or the like therethrough for connecting the rotor 98 to the outer sleeve 38 as shown in FIG. 2. A stator nut 122 completes the securement of the spacers 96 and contact rings 92 against the stator 86. The connections explained herein allow the rotor 98 to rotate freely around the stator 86.

Specifically, those parts of the rotor 98 and connected portions of the assembly that rotate include the nose cone 34, the assembly hose 40, the outer sleeve 38, the rotor 98, the rotor plate 112, and the contact pins 102.

In order for the swivel area components, including the rotor assembly to rotate freely about the stator and associated slip ring components, at least one bearing 124 is positioned between the outer sleeve 38 and the flange portion 59 at the aft end of the multiline termination 58 as shown in FIG. 2. Additionally, the slider ring 56 assists in the free rotation of the swivel area components around the slip ring components.

Accordingly, at least the rotor 98 along with the outer sleeve 38 rotate around the stator 86, which is in turn connected to the multiline termination 78. The tow cable 14 remains fixed, thereby alleviating the problem of torque on the tow cable 14 and the electrical leads therein.

The disclosed assembly provides the following advantages over any known termination or alternatives of known terminations. For example, the disclosed assembly allows independent rotation of the tow cable end with respect to the towed array. The assembly provides continuous electrical interface between the tow cable and the array even during rotation of the components. Further, the assembly provides redundant electrical path contacts through the slip ring section.

The inventive design is near neutrally buoyant in sea water as opposed to known designs which weigh about four pounds in water. This will drastically reduce the vibration and strum energy in the system. Further, the present design is compatible with a variety of tow cables without any modifications being made to the different tow cables.

The part count for the assembly is also drastically reduced from known designs, thereby reducing cost and assembly time. It is contemplated that the disclosed assembly will far exceed the known design life cycle of approximately one year since the design of the present invention provides a six year service life.

By the present invention, electrical connection is maintained between a tow cable and towed assembly in a manner which has not previously been known in the art. The disclosed assembly is, therefore, more efficient than previously achieved in the art.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A multiline tow cable assembly comprising:
    swivel components including:
        a rotor member connected to an external housing;
        at least one contact member formed within said rotor member and rotatable with said rotor; and
        first electrical leads connected to said at least one contact member;
    slip ring components including;
        a multiline termination member;
        a stator connected to said multiline termination member;
        at least one contact ring formed in connection with said stator;
        second electrical leads connected to said at least one contact ring; and
    a substantially friction free member interposed between said swivel components and said slip ring components for enabling relative rotation of said swivel components with respect to said slip ring components;
    wherein continuous electrical connection is maintained between said first and second electrical leads upon rotation of said swivel components with respect to said slip ring components.

2. The assembly according to claim 1 wherein the external housing member includes an outer sleeve, an inner sleeve connected to one end of said outer sleeve, a nose cone connected to one end of said inner sleeve, and an assembly hose connected to a second end of said outer sleeve.

3. The assembly according to claim 1 wherein said at least one contact member includes four contact member, adjacent ones of said contact members having a single spacer therebetween, and distal ends of each said contact member having an aperture formed therein for receiving said first electrical leads therethrough.

4. The assembly according to claim 1 wherein said at least one contact ring includes four contact rings, each contact ring including a tongue portion extending radially interior of said contact ring, a distal end of the tongue portion having an aperture formed therein for receiving said second electrical leads therethrough.

5. The assembly according to claim 1 further comprising a towed array connected to said swivel area components, said towed array transmitting collected data to said first electrical leads of said swivel area components.

6. The assembly according to claim 2 further comprising a tow cable connected to said nose cone, said tow cable including electrical wires for transmitting data generated by said towed array to a remote location.

7. The assembly according to claim 6 wherein said tow cable is threaded through a longitudinal opening in said nose cone.

8. The assembly according to claim 1 further comprising a slider ring interposed between said multiline termination member and said inner sleeve, said slider ring permitting rotation of said multiline termination member and said inner sleeve with respect to each other.

9. The assembly according to claim 1 wherein said multiline termination member includes a first end and a second end, an internal wall formed within said multiline termination member, an aperture formed at a radially central area of said internal wall, and a V-ring adaptor and V-ring packing formed adjacent the first end of said multiline termination member and on one side of said internal wall.

10. The assembly according to claim 9 wherein said tow cable passes through the aperture of and terminates on a second side of the inner wall of said multiline termination member.

11. The assembly according to claim 9 further comprising a rubber grommet and a seal plate positioned within said multiline termination member by a snap ring.

12. The assembly according to claim 11 wherein said rubber grommet and said seal plate are in surface contact with each other.

13. The assembly according to claim 1 wherein said substantially friction free member is a bearing.

14. The assembly according to claim 13 wherein said substantially friction free member include a plurality of bearings.

* * * * *